US006948157B2

(12) United States Patent
Larsson et al.

(10) Patent No.: US 6,948,157 B2
(45) Date of Patent: Sep. 20, 2005

(54) INTERPRETER FOR EXECUTING COMPUTER PROGRAMS AND METHOD FOR COLLECTING STATISTICS

(75) Inventors: Fredrik Larsson, Solna (SE); Bengt Werner, Akersberga (SE); Peter Magnusson, Lidingo (SE)

(73) Assignee: Virtutech AB, Stockholm (SE)

( * ) Notice: Subject to any disclaimer, the term of this patent is extended or adjusted under 35 U.S.C. 154(b) by 641 days.

(21) Appl. No.: 09/893,798

(22) Filed: Jun. 28, 2001

(65) Prior Publication Data

US 2002/0066091 A1 May 30, 2002

(30) Foreign Application Priority Data

Jun. 28, 2000 (SE) .............................................. 0002440

(51) Int. Cl.⁷ ................................................. G06F 9/45
(52) U.S. Cl. ...................... 717/139; 717/140; 717/146
(58) Field of Search ............................... 717/139–143, 717/146, 151–152

(56) References Cited

U.S. PATENT DOCUMENTS

| | | | | |
|---|---|---|---|---|
| 4,506,325 A | | 3/1985 | Bennett et al. ............. 364/200 |
| 5,287,490 A | * | 2/1994 | Sites .......................... 717/142 |
| 5,317,740 A | * | 5/1994 | Sites .......................... 717/129 |
| 5,392,408 A | | 2/1995 | Fitch .......................... 395/375 |
| 5,428,786 A | * | 6/1995 | Sites .......................... 717/151 |
| 5,469,574 A | * | 11/1995 | Chang et al. ............... 717/106 |
| 5,613,117 A | * | 3/1997 | Davidson et al. ........... 717/144 |
| 5,751,982 A | | 5/1998 | Morley ....................... 395/800 |
| 5,796,989 A | | 8/1998 | Morley et al. .............. 395/500 |
| 5,802,373 A | | 9/1998 | Yates et al. ................. 395/705 |
| 6,044,220 A | | 3/2000 | Breternitz, Jr. ............ 395/705 |
| 6,351,844 B1 | * | 2/2002 | Bala ........................... 717/128 |
| 6,463,582 B1 | * | 10/2002 | Lethin et al. ............... 717/158 |
| 6,631,515 B1 | * | 10/2003 | Berstis ........................ 717/140 |
| 6,760,903 B1 | * | 7/2004 | Morshed et al. ............ 717/130 |
| 6,842,894 B1 | * | 1/2005 | Havemose .................. 717/148 |

OTHER PUBLICATIONS

Radhakrishnan et al, "Improving Java performance using hardware translation", ACM ICS, pp 427–439, 2001.*
Skedzielewski et al, DI An interactive debugging interpreter for applicative language, ACM pp 102–112.*
Singer, "Porting legacy interpretive bytecode to the CLR", ACM PPPJ, pp 163–168, 2002.*
Magnusson, "Efficient instruction cache simulation and execution profiling with a threaded code interpreter", ACM Proc. winter simulation conf. pp 1093–1100, 1997.*

* cited by examiner

*Primary Examiner*—Anil Khatri
(74) *Attorney, Agent, or Firm*—Boyle, Fredrickson, Newholm, Stein & Gratz, S.C.

(57) ABSTRACT

The invention relates to a computer program interpreter and a method for the same, using statistics to group (SR89, SR17 . . . SR6; SR4, SR34 . . . SR16) frequently used service routines (SR) in the same program function and to control encoding of instructions. Frequently used service routines are assigned shorter codes thus enhancing the performance of a simulator or emulator.

40 Claims, 1 Drawing Sheet

INTERPRETER FOR EXECUTING COMPUTER PROGRAMS AND METHOD FOR COLLECTING STATISTICS

TECHNICAL FIELD

The present invention relates in general to interpreters for executing computer programs realizing, for example, simulators or emulators. More specifically, the present invention relates an apparatus, a method and a computer program product realizing an interpreter providing statistic control encoding for frequency based clustering of service routines in computer program execution.

BACKGROUND

With the growing complexity of computer software and the growing reliance on software systems in everyday life and business, there is an increasing need for a high performance in the execution of the software. Performance of software, such as program simulators and emulators, is often crucial since these programs are meant to simulate a system or, like an emulator, to mimic the behavior of a specific system embedded in a larger program complex. The execution of software programs depends on the operation of compilers and interpreters that translates or interprets instruction sets to machine executable code. To achieve high performance of an interactive simulator in cases when instruction sets are not easily decoded, the best practice is to translate the instruction into an internal format, which in this text is called an intermediate format. The intermediate format code is faster to decode and execute for a software-implemented interpreter and can be used directly if the instruction is decoded and executed again.

To achieve high performance, prior art software interpreters usually limit parameter space to an instruction, for example by mapping an instruction to different service routines depending on the parameters given to the instruction. For example, the sparc instruction 'add' may be mapped to two different service routines, one that adds two registers and one that adds a register with a constant. Therefore, the number of service routines will typically be higher than the number of instructions in the simulated instruction set. When the number of service routines grow to a large number, certain compiler optimizations with a high time complexity will make compilation times unacceptable or will fail completely.

PRIOR ART

An example of prior art is found in U.S. Pat. No. 5,905,895, to Halter, showing a method for optimizing interpretation by carrying out a static analysis of the target or guest binary code. Pairs or sequences of byte code are replaced by an optimized byte code, thereby in effect optimizing predefined sequences of instructions.

U.S. Pat. No. 5,623,617, to Davidian, also optimizes predefined sequences of instructions by recognizing repeated sequences of the same instruction or commonly used groups of instructions.

Another piece of prior art is found in U.S. Pat. No. 5,889,996, to Adams, which describes a method to change the instruction cache policy in order to improve the performance of a virtual machine. In practice, this method may be hard to use since there is no access from a user level program to do such changes.

U.S. Pat. No. 6,044,220 describes a hardware support using a hash table to aid decoding target or guest instructions.

Other pertinent literature describing background art are, for example, Bell, J. R. 1973. "Threaded Code." Communications of the ACM 16, no. 6 (June): 370–372, and Bedichek, R. 1990. "Some Efficient Architecture Simulation Techniques." In USENIX—Winter '90, 53–63.

Finally, the JP Abstract No JP 11296379 shows briefly how to optimize a memory arrangement.

OBJECT OF THE INVENTION

An object of the present invention is to solve the problem of achieving an improved interpreting method and interpreter for computer programs avoiding the drawbacks and problems of prior art interpreters.

An aspect of the problem to be solved is to decrease the overhead in certain service routine structures.

SUMMARY OF THE INVENTION

The present invention provides an optimization based on dynamically generated execution frequencies that optimize the fetch-decode-execute cycle for frequent individual instructions. Statistics is used to group frequently used service routines in the same program function and to control encoding of instructions. Frequently used service routines are assigned shorter codes thus enhancing the performance of a simulator or emulator and solving problems related to computer compiling speed.

The present invention is directed to an interpreter used to facilitate execution of program code that groups service routines into functions based on their frequency of execution using collected frequency of execution statistics. The interpreter preferably does so dynamically and can be implemented in hardware or software.

Program code, in the form of a computer program, includes instructions performed by the interpreter via corresponding service routines to perform the corresponding task or task defined thereby. The instructions are preferably first translated into an intermediate format comprising an intermediate code associated therewith.

The interpreter is configured to keep track of how often service routines are executed along with their parameters. The interpreter is configured to use the statistical frequency of service routine execution for the service routines to group frequently used service routines into a particular function using a predetermined frequency value. Where the interpreter has grouped service routines into two or more functions, jumps preferably are designated between each one of the functions. The interpreter preferably is also configured to keen track of how often service routines are executed after those of a particular function and preferably also is configured to assign more frequently executed service routines a shorter code than service routines executed after the aforementioned particular function. The gathered statistics from an execution are used by the interpreter to optimize service routines by grouping them and coding them in this manner resulting in faster execution speed.

Where the interpreter is configured to assign a shorter code to more frequently executed service routines, memory bandwidth usage is reduced when fetching intermediate code because the corresponding instruction is shorter. The interpreter can be configured to collect frequency of execution statistics before any simulator is compiled or can be configured to collect frequency of execution statistics and dynamically update a function by changing which service routines are grouped in it while the simulator is running.

Instruction sets written in a high level programming language can be used for a specific simulator task and translated into service routines capable of being statistically analyzed and assigned execution frequency based codes using the interpreter. The interpreter itself can be written in a high level programming language, such as standard ISO C.

The interpreter can be configured to share a program branch of a service routine in a particular function with all other service routines in that particular function. The interpreter can be configured to use a branch prediction table to reduce hard-to-predict jumps to reduce the number of jumps causing the table to function better on current processor architectures. The interpreter can also be configured to employ profile driven compilation to further enhance performance. The interpreter can be further configured to employ automatic compiler register mapping of often used variables by allocating them as local variables.

The interpreter can be configured so it does not use compiler specific extensions thereby providing compiler independence. If desired, the interpreter can be used by an emulator. The interpreter can also be configured to improve instruction cache performance by placing frequently used codes of service routines in the same function in a sequential block.

In a preferred method of interpreter operation, instructions of a computer program are preferably translated into an intermediate format that comprises an intermediate code such that service routines are used in carrying out program instructions. The interpreter collects and records statistics of how often the service routines are executed along with their parameters. Frequently used service routines are grouped into their own program function based on a predetermined frequency value. There preferably is a program jump designated between each program function to every other program function. There preferably also is a program jump or branch between each service routine to every other service routine within a particular program function. The interpreter preferably also keeps track of how frequently other service routines are executed after a particular program function. In an encoding step, the interpreter assigns more frequently executed service routines a shorter code. Shorter codes are preferably assigned to more frequently executed service routines than the codes assigned to service routines executed after a particular program function. The interpreter is able to do this after each execution to dynamically optimize frequently used service routines for faster execution speed.

An interpreter constructed in accordance with the invention can be implemented in the form of a computer program that is configured to perform an above described method in accordance with the invention using a data processor or a computer system.

DEFINITIONS

This section contains definitions and explanations of terms used in this text.

A code that runs on a host to perform the semantics of a simulated instruction is named a service routine.

A host is a computer the simulator is running on.

An intermediate format is defined as the way to structure and store intermediate code.

Intermediate code is instructions translated into a coding or internal code format that is easy for a software-based interpreter to interpret.

An interpreter is a hardware or software structure that performs operations specified in a program consisting of instructions.

BRIEF DESCRIPTION OF THE DRAWINGS

Henceforth reference is had to the attached figures for a better understanding of the present invention and its preferred embodiments, wherein.

DETAILED DESCRIPTION OF EMBODIMENTS

A central interpreter implemented in a high-level language e.g. "C" can be classified into one of three categories depending on its structure regarding service routines (SR), a code that performs the semantics of a simulated instruction. Either into one of the following categories all service routines in one function see FIG. 1, SR1, SR2, SR3 . . . SR100, only one service routine per function, see FIG. 2, SR1, SR2, SR3 . . . SR100, or the service routines are grouped into program functions with one or more service routines per function, see FIG. 3, according to prior art. A program function is marked up by a rectangle in attached FIG. 1 to FIG. 4. An instruction set is a set of operations and their encoding. The operation changes an internal state or performs an input or output. Examples of instruction sets are the Sparc v9 instruction set, which is typically interpreted by hardware, and the java virtual machine instruction set, which is typically interpreted by software.

Figure 3:
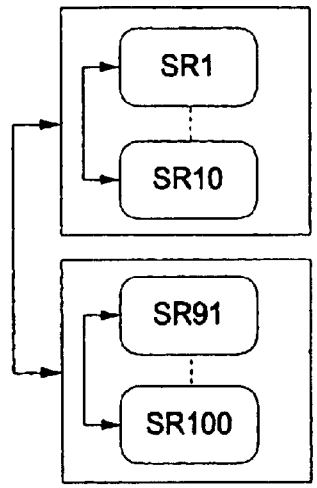
FIG. 3 schematically illustrates how service routines are grouped into functions with one or more service routines per function according to prior art.

In FIG. 3 the depicted two groups comprise service routines SR1 . . . SR10 and routine SR91 . . . SR100, respectively, other service routines SR11 . . . SR90 are not shown for reasons of simplicity. Each group makes up a program function.

Figure 1:
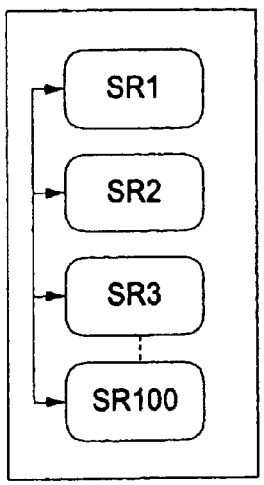
FIG. 1 schematically illustrates how all service routines are in one function according to prior art.

FIG. 1 schematically illustrates how all service routines are in one function according to prior art. The "all-SR" illustrated in FIG. 1 allows a compiler to accomplish various optimizations that affect several service routines, such as register allocation and code hoisting. Also, it comprises a low overhead when a software jump from one service routine to the next is accomplished. A serious problem is that when the number of service routines grows to a large number, certain compiler optimizations with a high time complexity will make compilation times unacceptable or will simply fail.

Figure 2:
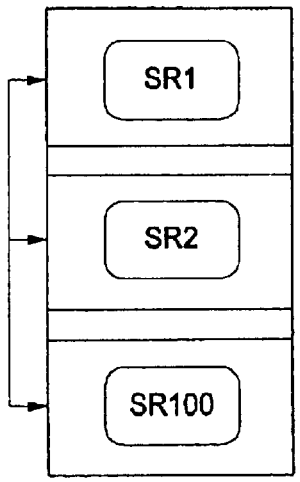
FIG. 2 schematically illustrates only one service routine per function according to prior art.

FIG. 2 schematically illustrates only one service routine per function according to prior art. The "single-SR" according to FIG. 2 does not allow any global optimization or automatic register allocation and will introduce a higher penalty for jumping from one service routine to the next when executing a software program.

FIG. 3 schematically illustrates how service routines are grouped into functions with one or more service routines per function according to prior art. The "group-SR" according to FIG. 3 is a compromise between two extremes such as single-SR and all-SR. When jumping between service routines in a function, it will have the same benefits as the all-SR but will suffer the overhead when jumping between functions.

The present invention introduces statistics to drastically reduce negative effects of the group-SR structure. Statistics are collected that show how often different service routines are executed and what parameters they had. Furthermore, the statistics also record the frequency of different service routines executed after a specific service routine.

Figure 4:
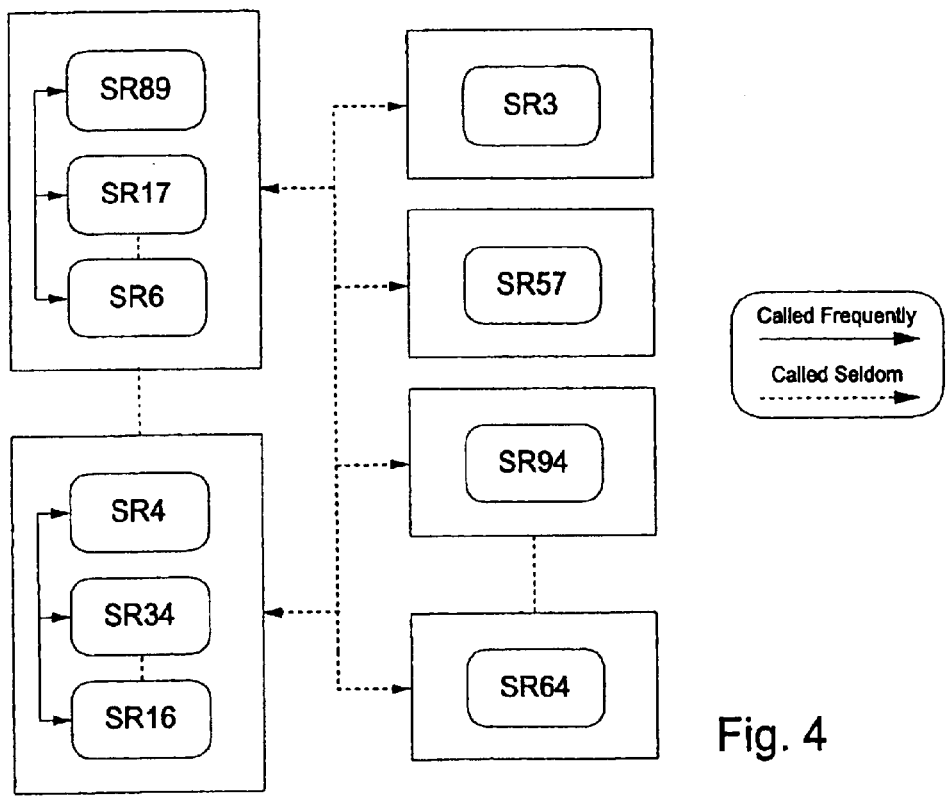
FIG. 4 schematically illustrates frequency clustering according to the present invention.

All the service routines that are executed frequently are grouped in one function, thus minimizing the jumps between functions. There may exist more than one such group, thus, it may result in more than one function. This is depicted in FIG. 4, which schematically illustrates frequency clustering according to the present invention with two groups in each function, the groups SR89, SR17 . . . SR6 and SR4, SR34 . . . SR16. This is the case if the statistics show that two or more groups of service routines are very common, but jumps between the groups are very infrequent. For example, the Intel x86 architecture has a 16 and a 32-bit mode in which the processor can operate.

A dotted arrow in FIG. 4 depicts seldom called service routines SR3, SR57, SR94 . . . SR64 and frequently called service routines SR89, SR17 . . . SR6 and SR4, SR34 . . . SR16 are depicted with unbroken arrows.

Both modes may be common but 32 bit instructions and 16 bit instructions seldom follow each other.

The intermediate format is designed so that frequent service routines can be pointed out using a shorter code than the infrequent service routines. In effect the statistics gathered from execution will control the encoding to optimize common service routines for speed. The encoding will lead to reduced bandwidth to memory when fetching intermediate code, as the frequently executed instructions will be shorter.

Statistics used to group service routines can be collected before a simulator, an emulator that also reports about how the system is behaving internally, is compiled or while the simulator is running, in which case the simulator dynamically updates the set of service routines used to simulate the instruction set.

By providing the present invention, realistic instruction sets translated to service routines can be written in a high-level language, compiled and yield a portable effective simulator. For example it would allow writing an interpreter in ISO C and make it portable while still having excellent performance. It allows the interpreter to have a large number of service routines without a negative performance impact. Said interpreter comprises, in one embodiment of the present invention:

statistics means for collecting and recording statistics of how often service routines are executed and what parameters they had;

clustering means for grouping frequently used service routines with program jumps between each other in a program function with regard to a predetermined frequency value for determining such service routines;

said statistics means recording the frequency of service routines executed after a said function; and encoding means for assigning a frequently used service routines a shorter code than service routines SR3, SR57, SR94 . . . SR64 executed after a said function, thus gathered statistics, from an execution, control an encoding to optimize frequently used service routines for faster execution speed.

A number of optimizations will be possible to apply. Common code might be shared within the function containing the frequent service routines. For example, the service routine epilogue which, among other things, checks for asynchronous events and fetches the intermediate code for the next instruction is identical for all sequential instructions and may be shared. A branch to a next service routine may be shared by all service routines in the function. This reduces the number of software jumps that are hard to predict in branch prediction tables, causing them to comply better with current processor architectures. Profile driven compilation may be used to enhance the simulator performance even more.

The present invention provides that manual work such as doing explicit register mapping of often-used variables is avoided. Instead, they may be allocated as local variables thus letting the compiler do the register allocation. It will also avoid using compiler specific extensions, such as the GNU C && operator which takes the address of a label, making it more compiler independent.

A method used by an interpreter according to the present invention performs the steps of:

collecting and recording statistics of how often service routines are executed and what parameters they had;

grouping frequently used service routines with program jumps between each other in a program function with regard to a predetermined frequency value for determining such service routines;

said statistics recording the frequency of service routines executed after a said function; and encoding for assigning frequently used service routines a shorter code than service routines executed after a said function, thus gathered statistics, from an execution, control an encoding to optimize frequently used service routines for faster execution speed. Also, it is able to set forth embodiments of the interpreter above as described through attached dependent claims.

The present invention improves instruction cache performance by placing frequent code in a sequential block as it is placed in a common function.

It is appreciated that the present invention can be realized by means of hardware, software or a combination thereof.

The present invention has been described by way of exemplifying embodiments, and it should be appreciated by the person skilled in the art that the invention can be realized in a variety of ways within the spirit of the claims.

What is claimed is:

1. An interpreter performing operations specified in a computer program comprised of instructions, said instructions being translated into an intermediate format comprising an intermediate code for said instructions, using a service routine to perform the semantics of an instruction, comprising:

means for collecting and recording statistics of how often service routines are executed and what parameters they had;

means for grouping frequently used service routines with program jumps between each other in a program function with regard to a predetermined frequency value for determining such service routines;

means for recording the frequency of service routines executed after said function; and means for assigning frequently used service routines a shorter code than service routines executed after said function from an execution.

2. An interpreter according to claim 1, wherein more than one program function is grouped by grouping (SR89, SR17 . . . SR6; SR4, SR34 . . . SR16) frequently used service routines with jumps between each other in the same function.

3. An interpreter according to claim 1, wherein said code assigning means reduces usage of electronic memory bandwith when fetching intermediate code.

4. An interpreter according to claim 1, further comprising a simulator, and wherein the interpreter is configured to collect said statistics before compilation of said simulator.

5. An interpreter according to claim 1, further comprising a simulator, and wherein the interpreter is configured to collect said statistics while said simulator is running such that said simulator dynamically updates said function with service routines used to simulate an instruction set.

6. An interpreter according to claim 1, wherein the instruction sets which are translated into service routines are written in a high-level programming language.

7. An interpreter according to claim 6, wherein the interpreter is written in standard ISO C.

8. An interpreter according to claim 1, wherein said program function has a plurality of service routines grouped in it, and wherein the interpreter is further configured to share a program branch with every one of said service routines in said program function.

9. An interpreter according to claim 8, wherein the interpreter is further configured to employ a branch prediction table that reduces the number of jumps between program functions.

10. An interpreter according to claim 1, wherein the interpreter is further configured with profile driven compilation.

11. An interpreter according to claim 1, wherein the interpreter is further configured to perform compiler register mapping of often used variables into local variables.

12. An interpreter according to claim 1, wherein the interpreter is configured with no compiler specific extensions.

13. An interpreter according to claim 1, wherein the interpreter is configured to place said codes assigned to said frequently executed service routines in said program function in a sequential block improving instruction cache performance.

14. An interpreter according to claim 1, further comprising an emulator and wherein the interpreter is used by said emulator.

15. A method for an interpreter performing operations specified in a computer program comprised of instructions and using service routines to perform the instructions, comprising the steps of:
    (a) dynamically collecting and recording statistics of how often service routines are executed and what parameters they had;
    (b) grouping frequently used service routines in a program function based on a predetermined frequency value for determining such service routines with program jumps between each other in said program function;
    (c) dynamically collecting and recording statistics of the frequency of service routines executed after said program function; and
    (d) assigning frequently used service routines a shorter code than service routines executed after said program function.

16. A method according to claim 15, wherein more than one said program function is produced by grouping frequently used service routines in step (b).

17. A method according to claim 15, further comprising the step of fetching an intermediate code from an electronic memory.

18. A method according to claim 15, providing a simulator and wherein said steps (a) and (c) are performed before said simulator is compiled.

19. A method according to claim 15, providing a simulator and wherein steps (a) and (c) are performed while said simulator is running dynamically updating said function with service routines used to simulate an instruction set.

20. A method according to claim 20, wherein said instructions which are translated into service routines are written in a high-level programming language.

21. A method according to claim 20, wherein the interpreter is written in a C programming language.

22. A method according to claims 15, wherein a program branch to a next service routine is shared by all service routines in said function.

23. A method according to claim 22, the step further comprising using a branch prediction table.

24. A method according to claim 15, the step further comprising using profile driven compilation.

25. A method according to claim 15, the step further comprising using compiler register mapping of often used variables.

26. A method according to claim 15, wherein no compiler specific extensions are used.

27. A method according to claim 15, wherein said codes assigned in step (d) of said frequently used service routines of said program function are placed in a sequential block improving instruction cache performance.

28. A method according to claim 15, providing an emulator that uses the interpreter.

29. An interpreter performing operations of computer program code instructions by means of service routines, comprising:
    a statistics mechanism devised to register the frequency of execution and the execution parameters of the service routines;
    a clustering mechanism devised to group frequently used service routines having mutual referring program jumps into a plurality of program functions dependent on a predetermined frequency value.

30. The interpreter as recited in claim 29, wherein said statistics mechanism is devised to register the frequency of service routines executed after establishing at least one of said plurality of program functions.

31. The interpreter as recited in claim 29, further comprising an encoding mechanism devised to assign a frequently used service routine a shorter code than service routines executed after at least one of said plurality of program functions.

32. A method for an interpreter performing operations of computer program code instructions by means of service routines, comprising the steps of:
    registering the frequency of execution and the execution parameters of the service routines;
    grouping frequently used service routines having mutual referring program jumps in a program function dependent on a predetermined frequency value.

33. The method as recited in claim 32, further comprising the step of registering the frequency of service routines executed after establishing said function.

34. The method as recited in claim 33, further comprising the step of assigning a frequently used service routine a shorter code than service routines executed after said function.

35. An interpreter for executing a computer program using service routines wherein the interpreter is configured to:
    (a) keep track of how frequently each service routine is executed during execution;
    (b) group a plurality of said service routines into one of a plurality of functions based on said frequency of service routine execution; and (c) dynamically regroup during execution one or more service routines into one of said plurality of functions based on said frequency of service routine execution of said service routines.

36. The interpreter of claim 35 that is further configured to group a first plurality of said service routines in a first one of said plurality of functions and to group a second plurality of said service routines in a second one of said plurality of functions and assign a service routine code to each said frequently used executed service routine grouped in one of said plurality of functions that is shorter than at least one other said service routine that is less frequently executed and that is not grouped in said one of said plurality of functions.

37. The interpreter of claim 36 wherein (i) each service routine of said first plurality of said service routines in said first one of said plurality of functions branches to every other service routine of said first one of said plurality of functions and each service routine of said second plurality of said service routines in said second one of said plurality of functions branches to every other service routine of said second one of said plurality of functions, and (ii) each one of said plurality of functions branches to every other one of said plurality of functions.

38. The interpreter of claim 36 wherein the interpreter is configured to arrange assigned service routine codes of said service routines in one of said plurality of functions in a sequential block.

39. The interpreter of claim 35 wherein the interpreter is configured to keep track of how frequently each service routine is executed by collecting and recording statistics of how often service routines are executed and what parameters they had.

40. The interpreter of claim 35 wherein the interpreter is configured to update one of said plurality of functions with service routines that simulate an instruction set.

* * * * *

UNITED STATES PATENT AND TRADEMARK OFFICE
CERTIFICATE OF CORRECTION

PATENT NO. : 6,948,157 B2
DATED : September 20, 2005
INVENTOR(S) : Fredrik Larsson et al.

It is certified that error appears in the above-identified patent and that said Letters Patent is hereby corrected as shown below:

Column 8,
Line 3, delete "20" and substitute -- 15 --.

Signed and Sealed this

Tenth Day of January, 2006

JON W. DUDAS
*Director of the United States Patent and Trademark Office*